US010376838B2

(12) United States Patent
Andersen et al.

(10) Patent No.: US 10,376,838 B2
(45) Date of Patent: Aug. 13, 2019

(54) OXIDATION CATALYST FOR HYDROCARBONS PRODUCED BY AN INTERNAL COMBUSTION ENGINE

(71) Applicant: Johnson Matthey Public Limited Company, London (GB)

(72) Inventors: Paul Andersen, Wayne, PA (US); Hai-Ying Chen, Wayne, PA (US); Kevin Doura, Audubon, PA (US); Joseph Fedeyko, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/712,187

(22) Filed: Sep. 22, 2017

(65) Prior Publication Data

US 2018/0078898 A1 Mar. 22, 2018

Related U.S. Application Data

(60) Provisional application No. 62/398,009, filed on Sep. 22, 2016.

(30) Foreign Application Priority Data

Oct. 13, 2016 (GB) .................................. 1617349.4

(51) Int. Cl.
*B01D 53/86* (2006.01)
*B01D 53/94* (2006.01)
*B01J 21/04* (2006.01)
*B01J 21/06* (2006.01)
*F01N 3/10* (2006.01)
*B01J 37/02* (2006.01)
*B01J 35/00* (2006.01)
*B01J 21/12* (2006.01)
*B01J 23/38* (2006.01)
(Continued)

(52) U.S. Cl.
CPC ......... *B01D 53/864* (2013.01); *B01D 53/944* (2013.01); *B01D 53/9459* (2013.01); *B01J 21/04* (2013.01); *B01J 21/066* (2013.01); *B01J 21/12* (2013.01); *B01J 23/38* (2013.01); *B01J 23/40* (2013.01); *B01J 23/462* (2013.01); *B01J 23/52* (2013.01); *B01J 29/00* (2013.01); *B01J 35/0006* (2013.01); *B01J 37/0244* (2013.01); *F01N 3/0835* (2013.01); *F01N 3/103* (2013.01); *F01N 3/106* (2013.01); *B01D 53/9472* (2013.01); *B01D 2255/106* (2013.01); *B01D 2255/1021* (2013.01); *B01D 2255/1023* (2013.01); *B01D 2255/1026* (2013.01); *B01D 2255/2065* (2013.01); *B01D 2255/2092* (2013.01); *B01D 2255/20715* (2013.01); *B01D 2255/902* (2013.01); *B01D 2255/9022* (2013.01); *B01D 2255/9032* (2013.01); *B01D 2255/9155* (2013.01); *B01D 2257/702* (2013.01); *B01D 2257/7025* (2013.01); *B01D 2258/012* (2013.01); *F01N 2370/02* (2013.01); *F01N 2370/04* (2013.01); *F01N 2510/063* (2013.01); *F01N 2510/068* (2013.01); *F01N 2510/0682* (2013.01); *F01N 2510/0684* (2013.01); *F01N 2570/12* (2013.01); *F01N 2570/145* (2013.01); *Y02A 50/2322* (2018.01); *Y02C 20/10* (2013.01); *Y02T 10/20* (2013.01)

(58) Field of Classification Search
CPC .......... B01D 53/864; B01D 2257/7025; B01D 2255/9032; B01D 2255/9022; B01D 2255/1026; B01D 53/9459; B01D 2255/9155; B01D 2255/902; B01D 53/9472; B01D 2255/1021; B01D 2255/1023; B01D 2255/106; B01D 2255/2065; B01D 2255/20715; B01D 2255/2092; B01D 2258/018; B01J 21/04; B01J 37/0244; B01J 35/0006; B01J 21/12; B01J 23/38; B01J 23/40; B01J 23/462; B01J 23/52; B01J 29/00; B01J 21/066; F01N 3/103; F01N 3/0835; F01N 3/106; F01N 2370/02; F01N 2370/04; F01N 2510/063; F01N 2510/0682; F01N 2510/0684; F01N 2570/12; F01N 2570/145; F01N 2510/068
See application file for complete search history.

(56) References Cited

U.S. PATENT DOCUMENTS 3,784,675 A * 1/1974 Kobylinski et al. ........................ B01D 53/9413
423/213.5
3,809,743 A * 5/1974 Upland et al. ..... B01D 53/9413
423/213.5
(Continued)

FOREIGN PATENT DOCUMENTS

EP 0885657 A2 12/1998
EP 2292316 A1 3/2011
(Continued)

OTHER PUBLICATIONS

Guliaeff et al.; SAE 2013-01-0531; Development of a Sulfur Tolerant PGM Based Zeolite Catalyst for Methane Oxidation and Low Temperature Hydrocarbon Trapping, Published Apr. 8, 2013.

*Primary Examiner* — Timothy C Vanoy
(74) *Attorney, Agent, or Firm* — Gary D. Mangels (57) ABSTRACT

An oxidation catalyst is described for treating hydrocarbons in an exhaust gas produced by an internal combustion engine, wherein the oxidation catalyst comprises a region disposed on a substrate, wherein the region comprises ruthenium (Ru) supported on a support material comprising a refractory oxide.

30 Claims, 6 Drawing Sheets

(51) Int. Cl.
  *B01J 23/40* (2006.01)
  *B01J 23/46* (2006.01)
  *B01J 23/52* (2006.01)
  *B01J 29/00* (2006.01)
  *F01N 3/08* (2006.01)

(56) References Cited

U.S. PATENT DOCUMENTS

| | | | |
|---|---|---|---|
| 3,825,654 A | | 7/1974 | Kobylinski et al. |
| 3,910,770 A | * | 10/1975 | Kobylinksi ........ B01D 53/9418 422/172 |
| 4,212,854 A | * | 7/1980 | Maki ................... B01D 53/62 423/247 |
| 7,318,915 B2 | | 1/2008 | Jordan et al. |
| 7,345,007 B2 | * | 3/2008 | Kagawa ................. B01J 23/42 502/327 |
| 8,475,755 B2 | * | 7/2013 | Dang .................. B01D 53/864 423/240 S |
| 2005/0137079 A1 | | 6/2005 | LaBarge |
| 2005/0288180 A1 | * | 12/2005 | Kagawa ................. B01J 23/42 502/230 |
| 2007/0014710 A1 | * | 1/2007 | Gerlach .............. B01D 53/945 423/213.5 |
| 2010/0290964 A1 | | 11/2010 | Southward et al. |
| 2011/0044874 A1 | * | 2/2011 | Dang .................. B01D 53/864 423/240 S |
| 2011/0047989 A1 | * | 3/2011 | Choung ................. F01N 3/106 60/297 |
| 2011/0173959 A1 | * | 7/2011 | Fisher ................ B01D 53/944 60/297 |
| 2014/0154160 A1 | * | 6/2014 | Fisher .................. B01D 53/94 423/213.5 |
| 2015/0037233 A1 | | 2/2015 | Fedeyko et al. |
| 2018/0043334 A1 | * | 2/2018 | Tanev ................. B01J 37/0242 |
| 2018/0078900 A1 | * | 3/2018 | Andersen ........... B01D 53/9418 |
| 2018/0078926 A1 | * | 3/2018 | Chen ....................... B01J 23/42 |

FOREIGN PATENT DOCUMENTS

| | | | | |
|---|---|---|---|---|
| EP | 2298433 A1 | | 3/2011 | |
| GB | 1 404 711 A | * | 9/1975 | ......... B01D 53/9413 |
| GB | 2093228 A | | 8/1982 | |
| WO | 9947260 A1 | | 9/1999 | |
| WO | 2005102513 A1 | | 11/2005 | |
| WO | 2007077462 A1 | | 7/2007 | |
| WO | 2011080525 A1 | | 7/2011 | |
| WO | 2012166868 A1 | | 12/2012 | |
| WO | 2016019067 A1 | | 2/2016 | |

* cited by examiner

OXIDATION CATALYST FOR HYDROCARBONS PRODUCED BY AN INTERNAL COMBUSTION ENGINE

CROSS REFERENCE TO RELATED APPLICATIONS

This application claims priority benefit to U.S. Provisional Patent Application No. 62/398,009 filed on Sep. 22, 2016, and Great Britain Patent Application No. 1617349.4 filed on Oct. 13, 2016, which is each incorporated herein by reference.

FIELD OF THE INVENTION

The invention relates to an oxidation catalyst and an exhaust system for treating an exhaust gas produced by a diesel engine. The invention further relates to a vehicle comprising the oxidation catalyst or the exhaust system.

BACKGROUND TO THE INVENTION

Legislation restricting the amount of pollutants that may be emitted into the atmosphere is becoming increasingly strict. One category of pollutant that is legislated against by inter-governmental organisations throughout the world is unburned hydrocarbons (HCs). Unburned HCs of varying composition are typically present in exhaust gases produced by various types of mobile or stationary engine, such as spark ignition engines, compression ignition engines and combustion turbines.

Saturated hydrocarbons having a relatively short-chain, such as methane ($CH_4$), ethane ($C_2H_6$) and propane ($C_3H_8$), are present in the exhaust gas produced by an internal combustion engine. These short-chain, saturated hydrocarbons are not very reactive compared to other species of hydrocarbon that make up the hydrocarbon component of an exhaust gas and they are particularly difficult to catalytically oxidise over a catalytic convertor in exhaust gases having a "lean" gas composition. Methane is also a potent greenhouse gas (GHG).

To compensate for the low reactivity of short-chain, saturated hydrocarbons, high temperatures and high loadings of Pt and/or Pd are often used to oxidise them. Platinum and palladium are precious metals. It is expensive to use a high loading of Pt and/or Pd in a catalytic convertor.

There are also internal combustion engines that are purpose-built or have been modified to use natural gas (NG) as a fuel. Engines are known that can use NG as a fuel in a variety of ways, such as alone (e.g. a "dedicated" NG engine) or in conjunction with another fuel (e.g. a bi-fuel engine) where the engine may be run on one fuel at a time or both fuels may be used in unison. When NG is used as a fuel, the exhaust gas produced by the engine contains significant quantities of methane (so-called "methane slip").

Natural gas (NG) typically comprises a hydrocarbon (HC) gas mixture and small amounts of carbon dioxide ($CO_2$), hydrogen sulfide ($H_2S$), water vapour ($H_2O$) and nitrogen ($N_2$). The main component of NG is methane ($CH_4$), but relatively small amounts of ethane ($C_2H_6$), propane ($C_3H_8$) and other hydrocarbons are usually also present. There is interest in using natural gas (NG) as a fuel for engines, particularly in the form of either compressed natural gas (CNG) or liquefied natural gas (LNG). For vehicular applications, the use of CNG as a fuel is typically preferred over LNG because CNG generally has both lower production and storage costs compared to LNG.

SUMMARY OF THE INVENTION

The invention provides an oxidation catalyst for treating hydrocarbons in an exhaust gas produced by an internal combustion engine, wherein the oxidation catalyst comprises a region disposed on a substrate, wherein the region comprises ruthenium (Ru) supported on a support material comprising a refractory oxide.

The inventors have surprisingly found that a catalytic component comprising ruthenium supported on a refractory oxide can provide excellent hydrocarbon oxidation activity. In comparison to platinum or palladium-containing catalytic components, these ruthenium-containing catalytic components can show high hydrocarbon conversion rates at low temperatures, particularly toward short-chain, saturated hydrocarbons, and especially when an equivalent amount of ruthenium is used instead of platinum or palladium on a same cost basis. When a ruthenium-containing catalytic component is used in combination with a platinum-containing catalytic component, then it may be possible to reduce or avoid the formation of nitrous oxide ($N_2O$).

The invention also relates to an exhaust system for treating hydrocarbons in an exhaust gas produced by an internal combustion engine. The exhaust system comprises the oxidation catalyst of the invention and optionally an emissions control device.

The invention further provides an apparatus or a vehicle. The apparatus or the vehicle comprises an internal combustion engine and either an oxidation catalyst or an exhaust system of the invention.

The invention also relates to the use of an oxidation catalyst to treat hydrocarbons in an exhaust gas produced by an internal combustion engine. The oxidation catalyst is an oxidation catalyst in accordance with the invention.

Also provided by the invention is a method of treating hydrocarbons in an exhaust gas produced by an internal combustion engine. The method comprises the step of passing an exhaust gas produced by an internal combustion engine through an exhaust system comprising the oxidation catalyst of the invention.

The expression "treat hydrocarbons" or "treating hydrocarbons" refers to the oxidation of hydrocarbons, particularly saturated hydrocarbons, such as methane, ethane and/or propane.

BRIEF DESCRIPTION OF THE DRAWINGS

FIG. 1 shows an oxidation catalyst having a first catalytic layer (2) comprising ruthenium. The first catalytic layer (2) is disposed on a second catalytic layer (3). The second catalytic layer (3) is disposed on the substrate (1).

FIG. 2 shows an oxidation catalyst having a first catalytic zone (2) comprising ruthenium. There is also a second catalytic zone (3) disposed on the substrate (1).

FIG. 3 shows an oxidation catalyst having a first catalytic zone (2) comprising ruthenium. The first catalytic zone (2) is disposed or supported on a second catalytic layer (3) at or near an inlet end of the substrate (1). The second catalytic layer (3) is disposed on the substrate (1).

FIG. 4 shows an oxidation catalyst having a first catalytic zone (2) comprising ruthenium. The first catalytic zone (2) is disposed on both a substrate (1) and a second catalytic zone (3).

FIG. 5 shows an oxidation catalyst having a first catalytic layer (2) comprising ruthenium. The first catalytic zone (2) is disposed on both a substrate (1) and a second catalytic zone (3).

FIGS. 8 and 9 show results for oxidation catalysts in accordance with the invention.

DETAILED DESCRIPTION OF THE INVENTION

The oxidation catalyst of the invention comprises, or consists essentially of, a region disposed on a substrate.

Typically, the region comprises, or consists essentially of, ruthenium (Ru) disposed or supported on a support material. The support material for ruthenium may be referred to herein as the "first support material". The label "first" is used herein to distinguish the support material for ruthenium from the support material(s) for other catalytic component(s).

The ruthenium is supported on the support material. The ruthenium may be disposed directly onto or is directly supported by the support material (e.g. there is no intervening material between the ruthenium and the support material). The ruthenium is supported on the support material by being dispersed over a surface of the support material, more preferably by being dispersed over, fixed onto a surface of and/or impregnated within the support material.

Particles of ruthenium are typically supported on particles of the support material. It is preferred that a particle of ruthenium is supported on a particle of the support material (i.e. a surface of a particle of the support material).

Typically, the support material comprises, or consists essentially of, a refractory oxide. It is preferred that the refractory oxide comprises, or consists essentially of, alumina ($Al_2O_3$) or ceria-zirconia ($CeO_2$—$ZrO_2$).

When the refractory oxide comprises, or consists essentially of, ceria-zirconia, then typically the ceria-zirconia comprises at least 45% by weight ceria, preferably at least 50% by weight ceria, more preferably at least 55% by weight ceria, such as at least 70% by weight ceria.

The ceria-zirconia may further comprise a total of 1 to 15% by weight, preferably 2 to 12.5% by weight (e.g. 5 to 10% by weight), of an oxide or oxides of a second rare earth metal (e.g. the second rare earth metal is not cerium). The second rare earth metal is typically selected from the group consisting of lanthanum (La), praseodymium (Pr) and combinations thereof.

Generally, the ceria-zirconia consists essentially of 45 to 95% by weight of ceria and 5 to 55% by weight of zirconia (e.g. 50 to 95% by weight ceria and 5 to 50% by weight zirconia), preferably 55 to 80% by weight of ceria and 20 to 45% by weight zirconia.

The refractory oxide may optionally be doped (e.g. with a dopant). Refractory oxides doped with a dopant can be prepared using methods known in the art.

When the refractory oxide is doped, the total amount of dopant is 0.25 to 5% by weight, preferably 0.5 to 3% by weight (e.g. about 1% by weight) of the support material.

When the refractory oxide comprises alumina, then the dopant may comprise, or consist essentially of, an element selected from the group consisting of cerium (Ce), zirconium (Zr), titanium (Ti), silicon (Si), yttrium (Y), lanthanum (La), praseodymium (Pr), samarium (Sm), neodymium (Nd) and an oxide thereof.

When the refractory oxide comprises, or consists essentially of, ceria-zirconia, then the dopant may comprise, or consist essentially of, an element selected from the group consisting of titanium (Ti), silicon (Si), yttrium (Y), lanthanum (La), praseodymium (Pr), samarium (Sm), neodymium (Nd) and an oxide thereof.

It may be preferable that the refractory oxide is not doped (e.g. with a dopant).

Typically, the region comprises ruthenium in an amount of 0.05 to 10% by weight (e.g. of the support material), preferably 0.1 to 5% by weight, more preferably 0.25 to 2.5% by weight (e.g. 0.25 to 1% by weight).

The region typically comprises a total loading of ruthenium of 5 to 300 g ft$^{-3}$, more preferably 10 to 250 g ft$^{-3}$, such as 20 to 200 g ft$^{-3}$, still more preferably 25 to 175 g ft$^{-3}$, and even more preferably 35 to 150 g ft$^{-3}$ (e.g. 50 to 125 g ft$^{-3}$). For example, the region may comprise a total loading of ruthenium of 5 to 150 g ft$^{-3}$, more preferably 7.5 to 125 g ft$^{-3}$, such as 10 to 110 g ft$^{-3}$, still more preferably 25 to 100 g ft$^{-3}$, and even more preferably 30 to 75 g ft$^{-3}$ (e.g. 40 to 125 g ft$^{-3}$).

The region may comprises a total loading of support material of 0.1 to 4.5 g in$^{-3}$ (e.g. 0.25 to 4.2 g in$^{-3}$), preferably 0.3 to 3.8 g in$^{-3}$, still more preferably 0.5 to 3.0 g in$^{-3}$ (1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$). When the region includes a second support material for a noble metal, then the total loading includes the amount of the second support material. The total loading does not include any hydrocarbon adsorbent or catalytic material that may be in the region.

The oxidation catalyst may further comprise a noble metal (NM) selected from the group consisting of platinum (Pt), palladium (Pd), a combination or a mixture of platinum (Pt) and palladium (Pd), and a combination or a mixture of palladium (Pd) and gold (Au).

The NM may be disposed or supported on a support material. The support material of the NM is referred to herein as the "second support material". The label "second" is used herein to distinguish the support material for the NM from the support material for ruthenium.

The NM may be disposed directly onto or is directly supported by the second support material (e.g. there is no intervening material between the NM and the second support material). The NM is supported on the second support material by being dispersed over a surface of the second support material, more preferably by being dispersed over, fixed onto a surface of and/or impregnated within the second support material.

Particles of the NM are typically supported on particles of the second support material. It is preferred that a particle of the NM is supported on a particle of the second support material (i.e. a surface of a particle of the second support material).

When the noble metal comprises a combination of platinum and palladium, then the noble metal may be a platinum-palladium alloy, such as a bimetallic platinum-palladium alloy. However, it may be preferable that the combination of platinum and palladium does not comprise a platinum-palladium alloy.

When the NM comprises a combination or a mixture of platinum and palladium, then the ratio by weight of platinum to palladium in the region (e.g. the first or second region) is typically 25:1 to 1:10, preferably 10:1 to 1:4, such as 5:1 to 1:3 (e.g. 4:1 to 1:2).

It may be preferable that the ratio by weight of platinum to palladium in the region (e.g. the first or second region) is ≥1:1. The ratio by weight of platinum to palladium in the region may be 25:1 to 1.1:1, such as 10:1 to 1.5:1, preferably 5:1 to 2:1.

When the noble metal comprises a combination of palladium and gold, then the noble metal may be a palladium-gold alloy, such as a bimetallic palladium-gold alloy.

Generally, the region (e.g. the first or second region) comprises a ratio by weight of palladium (Pd) to gold (Au) of 9:1 to 1:9, preferably 5:1 to 1:5, and more preferably 2:1 to 1:2. This is the ratio by weight of palladium to gold that is supported on the third support material.

The second support material comprises, or consists essentially of, a refractory oxide. The refractory oxide may comprise, or consist essentially of, alumina, silica, titania, zirconia or ceria, or a mixed or composite oxide thereof, such as a mixed or composite oxide of two or more thereof. For example, the mixed or composite oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide may optionally be doped (e.g. with a dopant). The dopant may comprise, or consist essentially of, an element selected from the group consisting of cerium (Ce), zirconium (Zr), titanium (Ti), silicon (Si), yttrium (Y), lanthanum (La), praseodymium (Pr), samarium (Sm), neodymium (Nd) and an oxide thereof. It is preferred that an element (e.g. of the dopant) is different to an element of the refractory oxide. Thus, silica is preferably not doped with silicon.

When the refractory oxide is doped, the total amount of dopant is 0.25 to 5% by weight, preferably 0.5 to 3% by weight (e.g. about 1% by weight).

It may be preferable that the refractory oxide is not doped (e.g. with a dopant).

It is preferred that the refractory oxide comprises alumina, silica or a mixed or composite oxide of silica and alumina.

In general, when the refractory oxide is a mixed or composite oxide of silica and alumina, then preferably the refractory oxide comprises 0.5 to 45% by weight of silica (i.e. 55 to 99.5% by weight of alumina), preferably 1 to 40% by weight of silica, more preferably 1.5 to 30% by weight of silica (e.g. 1.5 to 10% by weight of silica), particularly 2.5 to 25% by weight of silica, more particularly 3.5 to 20% by weight of silica (e.g. 5 to 20% by weight of silica), even more preferably 4.5 to 15% by weight of silica.

When the refractory oxide comprises, or consists essentially of, alumina, then the alumina may optionally be doped (e.g. with a dopant). The dopant may comprise, or consist essentially of, silicon (Si) or an oxide thereof.

When the alumina is doped with a dopant comprising silicon or an oxide thereof, then preferably the alumina is doped with silica. The alumina is preferably doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

It is preferred that the refractory oxide comprises, or consists essentially of, alumina (e.g. alumina that is not doped).

The composition of the first support material (e.g. the support material for ruthenium) may be the same as or different to the composition of the second support material.

Typically, the oxidation catalyst comprises an amount of the noble metal (i.e. the NM supported on the second support material) of 0.05 to 10% by weight (e.g. of the second support material), preferably 0.1 to 5% by weight, more preferably 0.25 to 2.5% by weight (e.g. 0.25 to 1% by weight).

When the NM is supported on the second support material, the oxidation catalyst, the first region or the second region typically comprises a total loading of the NM of 5 to 300 g ft$^{-3}$, more preferably 10 to 250 g ft$^{-3}$, such as 20 to 200 g ft$^{-3}$, still more preferably 25 to 175 g ft$^{-3}$, and even more preferably 35 to 150 g ft$^{-3}$ (e.g. 50 to 125 g ft$^{-3}$). For example, the oxidation catalyst may comprise a total loading of the NM of 5 to 150 g ft$^{-3}$, more preferably 7.5 to 125 g ft$^{-3}$, such as 10 to 110 g ft$^{-3}$, still more preferably 25 to 100 g ft$^{-3}$, and even more preferably 30 to 75 g ft$^{-3}$ (e.g. 40 to 125 g ft$^{-3}$).

The oxidation catalyst of the invention may further comprise a catalytic material comprising, or consisting essentially of, a molecular sieve and a platinum group metal (PGM) supported on the molecular sieve. The catalytic material is for oxidising hydrocarbons in an exhaust gas produced by an internal combustion engine, particularly an exhaust gas produced by an internal combustion engine operating under lean or stoichiometric conditions.

Typically, the platinum group metal (PGM) supported on the molecular sieve is selected from the group consisting of platinum (Pt), palladium (Pd) and a combination of platinum (Pt) and palladium (Pd). It is preferred that the platinum group metal is selected from the group consisting of palladium (Pd), and a combination of platinum (Pt) and palladium (Pd). The platinum group metal may be palladium (Pd). Alternatively, the platinum group metal (PGM) may be a combination of platinum (Pt) and palladium (Pd). Excellent oxidation activity may be obtained when the catalytic material comprises palladium (Pd).

When the platinum group metal (PGM) is a combination of platinum (Pt) and palladium (Pd), then the combination of Pt and Pd may be selected from the group consisting of separately supported Pt and Pd, a mixture of Pt and Pd, an alloy of Pt and Pd, and both a mixture and an alloy of Pt and Pd. When the PGM is separately supported Pt and Pd, then the particles of Pt and Pd are supported on separate sites of the molecular sieve. The mixture or alloy of Pt and Pd is preferably bimetallic.

Typically, the molecular sieve comprises the platinum group metal (i.e. as defined above) as the only transition metal, preferably the only platinum group metal (i.e. no other platinum group metals may be present other than those explicitly recited).

The catalytic material preferably consists essentially of (i) a platinum group metal (PGM) and/or an oxide thereof; and (ii) a molecular sieve as defined herein; wherein the platinum group metal (PGM) is selected from the group consisting of platinum (Pt), palladium (Pd) and a combination of platinum (Pt) and palladium (Pd).

In general, the molecular sieve has a framework comprising silicon, oxygen and optionally germanium.

The molecular sieve is typically a crystalline molecular sieve, such as a zeolite.

Typically, the molecular sieve has a framework having a content of heteroatom T-atoms of ≤ about 0.20 mol %. As is known in the art, the term "T-atom" is an abbreviation for "tetrahedrally coordinated atom", which is present in the framework of the molecular sieve.

The term "heteroatom" as used herein in the context of "T-atoms" refers to atoms that are not silicon and not oxygen (i.e. non-silicon, non-oxygen heteroatoms), particularly atoms that are not silicon, not germanium and not oxygen (i.e. non-silicon, non-germanium, non-oxygen heteroatoms).

The molecular sieve may have a framework that comprises one or more heteroatom T-atom. The heteroatom may, for example, be selected from the group consisting of aluminium (Al), boron (B), gallium (Ga), titanium (Ti), zinc (Zn), iron (Fe), vanadium (V) and combinations of any two or more thereof. More preferably, the heteroatom is selected from the group consisting of aluminium (Al), boron (B), gallium (Ga), titanium (Ti), zinc (Zn), iron (Fe) and combinations of any two or more thereof. For the avoidance of doubt, the heteroatom T-atoms cannot be germanium.

The molecular sieve may have a framework comprising silicon, oxygen, germanium and heteroatom T-atoms, and a content of heteroatom T-atoms is ≤ about 0.20 mol % (or as defined below). It may be preferable that the molecular sieve has a framework consisting essentially of silicon, oxygen, germanium and heteroatom T-atoms. More preferably, the molecular sieve may have a framework consisting essentially of silicon, oxygen and germanium (e.g. as the constituent atoms of the framework), wherein the amount of germanium is as defined below (e.g. the content of heteroatom T-atoms is 0.00 mol %).

When the molecular sieve has a framework comprising germanium, then typically the amount of germanium (e.g. germanium T-atoms) is ≤ about 10 mol %, preferably ≤ about 5 mol % and more preferably ≤ about 1 mol %.

The molecular sieve may have a framework comprising silicon, oxygen and heteroatom T-atoms, and a content of heteroatom T-atoms is ≤ about 0.20 mol % (or as defined below). It may be preferable that the molecular sieve has a framework consisting essentially of silicon, oxygen and heteroatom T-atoms (e.g. as the constituent atoms of the framework). More preferably, the molecular sieve may have a framework consisting essentially of silicon and oxygen (e.g. the content of heteroatom T-atoms is 0.00 mol %).

The molecular sieve may preferably have a content of heteroatom T-atoms of < about 0.17 mol %, more preferably ≤ about 0.15 mol %, such as < about 0.15 mol %, and even more preferably ≤ about 0.12 mol % (e.g. < about 0.12 mol %).

Typically, the molecular sieve may have a content of heteroatom T-atoms of ≥ about 0.001 mol %, preferably ≥ about 0.010 mol %, more preferably ≥ about 0.020 mol %.

In some instances, the molecular sieve does not have a content of heteroatom T-atoms (i.e. the molecular sieve does not comprise heteroatom T-atoms).

Typically, the molecular sieve has a framework type selected from the group consisting of AEI, AFI, AFX, ANA, AST, ASV, ATS, BCT, BEA, BEC, BOF, BOG, BRE, CAN, CDO, CFI, CGS, CHA, -CHI, CON, CSV, DAC, DDR, DOH, DON, EAB, EDI, EEI, EMT, EON, EPI, ERI, ESV, ETR, EUO, -EWT, FAR, FAU, FER, GON, HEU, IFR, -IFU, IFW, IFY, IHW, IMF, IRN, IRR, -IRY, ISV, ITE, ITG, ITH, -ITN, ITR, ITT, -ITV, ITW, IWR, IWS, IWV, IWW, JNT, JOZ, KFI, LEV, LOV, LTA, LTF, MAZ, MEI, MEL, MEP, MER, MFI, MFS, MOR, MOZ, MRE, MSE, MSO, MTF, MTN, MTT, MTW, MVY, MWF, MWW, NAB, NES, NON, NSI, OBW, OFF, OKO, PAU, PCR, PHI, POS, PSI, RHO, -RON, RRO, RSN, RTE, RTH, RUT, RWR, RWY, SEW, SFE, SFF, SFG, SFH, SFN, SFS, SFV, SFW, SGT, SOD, SOF, SSF, -SSO, SSY, STF, STI, STO, STT, STW, -SVR, SVV, SZR, TON, TUN, UFI, UOS, UOV, UTL, UWY, VET, VNI and VSV. Each of the aforementioned three-letter codes represents a framework type in accordance with the "IUPAC Commission on Zeolite Nomenclature" and/or the "Structure Commission of the International Zeolite Association".

It is preferred that the molecular sieve is a zeolite. The zeolite may be referred to as a silica-containing zeolite, such as a siliceous zeolite.

The zeolite is typically selected from the group consisting of an aluminosilicate zeolite, a boro-aluminosilicate zeolite, a gallium aluminosilicate zeolite, a germanosilicate zeolite and a titaniosilicate zeolite. In each of these types of zeolite, the content of heteroatom T-atoms is as defined above. Thus, these zeolites are siliceous (i.e. high silica-containing) zeolites having a low content of heteroatom T-atoms, such as aluminium (Al), boron (B), gallium (Ga), and titanium (Ti) and optionally also zinc (Zn), iron (Fe).

It is preferred that the zeolite is a siliceous zeolite, such as a pure silica zeolite. The siliceous zeolite or pure silica zeolite may be a zeolite selected from the tables below.

| Siliceous zeolite or pure silica zeolite | Framework type |
|---|---|
| SSZ-24 | AFI |
| octadecasil | AST |
| SSZ-55 | ATS |
| zeolite beta | BEA |
| ITQ-14 | BEC |
| CIT-5 | CFI |
| chabazite | CHA |
| deca-dodecasil | DDR |
| dodecasil-1H | DOH |
| UTD-1 | DON |
| EU-1 | EUO |
| dealuminated zeolite-Y | FAU |
| ferrierite | FER |
| GUS-1 | GON |
| SSZ-42 | IFR |
| ITQ-4 | IFR |
| ITQ-32 | IHW |
| ITQ-7 | ISV |
| ITQ-3 | ITE |
| ITQ-13 | ITH |
| ITQ-12 | ITW |
| ITQ-24 | IWR |
| ITQ-29 | LTA |
| ZSM-11 | MEL |
| silicalite | MFI |
| SSZ-61 | — |
| ZSM-5 | MFI |
| MCM-35 | MTF |
| ZSM-39 | MTN |
| dodecasil-3c | MTN |
| CF-4 | MTN |
| ZSM-23 | MTT |
| ZSM-12 | MTW |
| ITQ-1 | MWW |
| MCM-22 | MWW |
| SSZ-35 | MWW |
| nonasil | NON |
| RUB-41 | RRO |
| RUB-3 | RTE |
| RUB-10 | RUT |
| RUB-24 | RWR |
| SSZ-73 | SAS |
| sigma-2 | SGT |
| sodalite trioxane | SOD |
| sodalite ethylene glycol | SOD |
| SSZ-35 | STF |
| ITQ-9 | STF |
| MU-26 | STF |
| SSZ-23 | STT |
| theta-1 | TON |
| SSZ-26 | — |
| SSZ-31 | — |

As is known in the art, a siliceous zeolite or pure silica zeolite has a framework comprising, or consisting essentially of, $SiO_4$ tetrahedra.

It is generally preferred that the molecular sieve, particularly when the molecular sieve is a zeolite, has a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, -ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, -SSO, SSY, STF, STO, STT, -SVR, SVV, TON, TUN, UOS, UOV, UTL, UWY, VET, VNI. More preferably, the molecular sieve or zeolite has a framework type selected from the group consisting of BEA, CDO, CON, MEL, MWW, MFI and FAU, even more preferably the framework type is selected from the group consisting of BEA and MFI.

When a heteroatom T-atom is aluminium, the molecular sieve or zeolite may have a SAR of ≥1200. It may be preferable that the SAR is ≥1300, such as ≥1500 (e.g. ≥1700), more preferably ≥2000, such as ≥2200, particularly ≥3000.

Various methods are known in the art for preparing molecular sieves, particularly zeolites, with a high silica content (e.g. a high SAR), and a specific framework type and pore diameter. Numerous methods are also known for preparing a transition metal, such as a platinum group metal, supported on a zeolite. See, for example, WO 2012/166868.

The zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms).

When the molecular sieve or zeolite is a small pore molecular sieve or zeolite, then preferably the small pore molecular sieve or zeolite has a framework type selected from the group consisting of AEI, AFX, ANA, CDO, CHA, DDR, EAB, EDI, EPI, ERI, IHW, ITE, ITW, KFI, LEV, MER, NSI, PAU, PHI, RHO, RTH, UFI and VNI. More preferably, the small pore molecular sieve or zeolite has a framework type that is CHA, CDO or DDR.

When the molecular sieve or zeolite is a medium pore molecular sieve or zeolite, then preferably the medium pore molecular sieve or zeolite has a framework type selected from the group consisting of MFI, MEL, MWW and EUO. More preferably, the medium pore molecular sieve or zeolite has a framework type selected from the group consisting of MFI, MEL and MWW, such as MFI.

When the molecular sieve or zeolite is a large pore molecular sieve or zeolite, then preferably the large pore molecular sieve or zeolite has a framework type selected from the group consisting of AFI, CON, BEA, FAU, MOR and EMT. More preferably, the large pore molecular sieve or zeolite has a framework type selected from the group consisting of AFI, BEA, CON and FAU, such as BEA.

In general, the catalytic material may comprise a total amount of the platinum group metal (PGM), preferably a total amount of the platinum group metal (PGM) supported on the molecular sieve, of 0.01 to 30% by weight (e.g. of the molecular sieve). It is preferred that the total amount of the PGM, particularly the total amount of the PGM supported on the molecular sieve, is 0.1 to 20% by weight, such as 0.2 to 15% by weight.

It may preferable that the total amount of the PGM (e.g. the total amount of PGM supported on the molecular sieve) is 6 to 30% by weight, more preferably 7.5 to 25% by weight, such as 10 to 20% by weight.

When the PGM comprises palladium (e.g. when palladium is present either singly or in combination with another metal), then the catalytic material typically comprises a total amount of palladium, preferably a total amount of palladium supported on the molecular sieve, of 0.01 to 20% by weight (e.g. 0.02 to 15% by weight). Preferably, the catalytic material comprises a total amount of palladium, particularly a total amount of palladium supported on the molecular sieve, of 0.1 to 15% by weight, such as 0.2 to 10% by weight. More preferably, the catalytic material comprises a total amount of palladium (e.g. the total amount of palladium supported on the molecular sieve) of 0.5 to 10% by weight, such as 0.75 to 7.5% by weight.

It may be preferable that the catalytic material typically comprises a total amount of palladium, preferably a total amount of palladium supported on the molecular sieve, of 4 to 20% by weight (e.g. 4.5 to 20% by weight), such as 5 to 17.5% by weight, more preferably 7.5 to 15% by weight.

The PGM is supported on the molecular sieve. The term "supported" in this context refers to PGM that is associated with the molecular sieve. Typically, the PGM is associated (e.g. as an ion-association or as a covalent association) with the molecular sieve, such as with the silanol groups of the molecular sieve.

Some of the PGM may be located insides the pores of the molecular sieve. The catalytic material may have at least 1% by weight (i.e. of the amount of PGM of the catalytic material) of the PGM located inside pores of the molecular sieve, preferably at least 5% by weight, more preferably at least 10% by weight. The amount of PGM inside the pores of the molecular sieve can be determined using conventional techniques or by the method described in SAE 2013-01-0531.

The catalytic material may have ≤75% by weight (i.e. of the amount of PGM of the catalytic material) of the PGM located inside pores of the molecular sieve, preferably ≤50% by weight.

The region may further comprise a hydrocarbon adsorbent material. The hydrocarbon adsorbent material may be a zeolite. Preferably, a platinum group metal, such as defined above, is not supported on the zeolite. For the avoidance of doubt, the hydrocarbon adsorbent material, which may be a zeolite, is different (i.e. in composition) to the catalytic material described above.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the oxidation catalyst comprises a hydrocarbon adsorbent, then the total loading of hydrocarbon adsorbent in the washcoat region is 0.05 to 3.00 g in$^{-3}$, particularly 0.10 to 2.00 g in$^{-3}$, more particularly 0.2 to 1.0 g in$^{-3}$. For example, the total loading of hydrocarbon adsorbent in the oxidation catalyst may be 0.8 to 1.75 g in$^{-3}$, such as 1.0 to 1.5 g in$^{-3}$.

The oxidation catalyst of the invention relates to various arrangements of the ruthenium-containing catalytic component, the noble metal supported on a second support material, the catalytic material and the hydrocarbon adsorbent described above.

In general, when the oxidation catalyst comprises a second region, then the region comprising the ruthenium-containing catalytic component described above is labelled as the "first region" to distinguish it from the second region.

The first region is different (i.e. in composition) to the second region (i.e. the composition of the second region). The second region preferably does not comprise ruthenium, particularly ruthenium disposed or support on a support material, especially the first support material described herein.

In a first oxidation catalyst aspect, the oxidation catalyst comprises a region, which comprises, or consists essentially of, a mixture of (a) the ruthenium disposed or supported on the first support material and (b) at least one of (i) the noble metal disposed or supported on a second support material and (ii) the catalytic material comprising, or consisting essentially of, a molecular sieve and a platinum group metal (PGM) supported on the molecular sieve. It is preferred that the region comprises, or consists essentially of, a mixture of (a) the ruthenium disposed or supported on the first support material and (b) the noble metal (PGM) disposed or supported on a second support material.

When the region comprises the NM disposed or supported on a second support material, then the region typically comprises, or consists essentially of, a mixture of (a) a plurality of particles of ruthenium (Ru) supported on the first support material and (b) a plurality of particles of the noble metal supported on the second support material. The particles of ruthenium (Ru) supported on a first support material are separate (i.e. are distinct from) to the particles of NM supported on a second support material.

It may be preferred that the region is substantially free of (i) NM supported on the first support material and/or (ii) ruthenium supported on the second support material.

The region is disposed or supported on the substrate. It is preferred that the region is directly disposed or directly supported on the substrate (i.e. the region is in direct contact with a surface of the substrate).

The oxidation catalyst may comprise a single region. The region may be a layer (e.g. a single layer).

Alternatively, the oxidation catalyst may further comprise a second region, such as in an arrangement as described below. The second region may comprise, or consist essentially of, the catalytic material (i.e. as described above) or a hydrocarbon adsorbent.

In a second oxidation catalyst aspect, the oxidation catalyst further comprises a second region, wherein the second region comprises, or consists essentially of, the NM disposed or supported on a second support material, such as defined above.

In a third oxidation catalyst aspect, the oxidation catalyst further comprises a second region, wherein the second region comprises, or consists essentially of, the catalytic material as defined above (i.e. the catalytic material comprising a molecular sieve and a platinum group metal (PGM) supported on the molecular sieve).

In the second and third oxidation catalyst aspects, the first region comprises, or consists essentially of, the ruthenium disposed or supported on the first support material. It may be preferable that the first region is substantially free of the NM supported on the second support material and/or the catalytic material (i.e. comprising a molecular sieve and a platinum group metal (PGM) supported on the molecular sieve). More preferably the first region does not comprise the NM supported on the second support material and/or the catalytic material.

In the second and third oxidation catalyst aspects, the first region is preferably substantially free of a hydrocarbon adsorbent material, particularly a zeolite. More preferably, the first region and the second region is each substantially free of a hydrocarbon adsorbent material, particularly a zeolite.

Generally, the oxidation catalyst of the invention is substantially free of rhodium.

The following arrangements relate to each of the first, second and third oxidation catalyst aspects when there is a first region and a second region.

The first region and/or the second region may be disposed or supported on the substrate.

Figure 1:
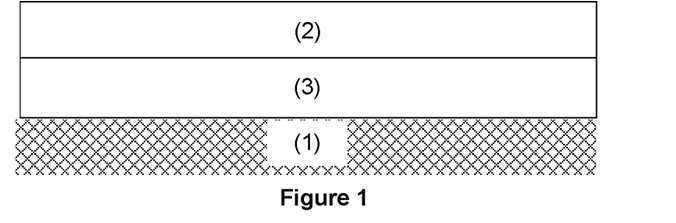
FIGS. 1 to 5 are schematic representations of oxidation catalysts of the invention.
Figure 2:
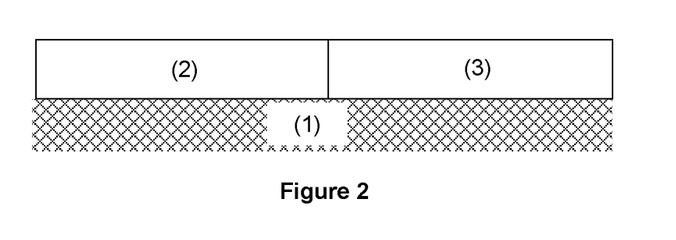
Figure 3:
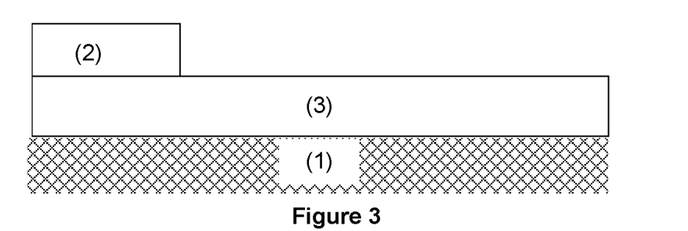
Figure 4:
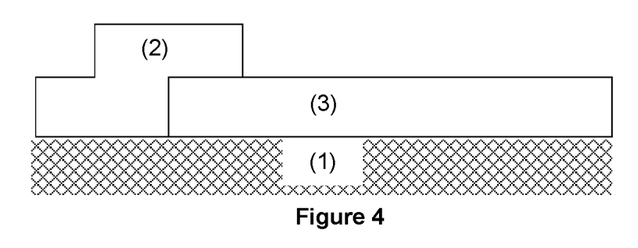

The first region may be disposed directly on to the substrate (i.e. the first region is in contact with a surface of the substrate; see FIGS. 1 to 4). The second region may be:
(a) disposed or supported on the first region (e.g. see FIGS. 2 to 4); and/or
(b) disposed directly on to the substrate [i.e. the second region is in contact with a surface of the substrate] (e.g. see FIGS. 1 to 3); and/or
(c) in contact with the first region [i.e. the second region is adjacent to, or abuts, the first region].

When the second region is disposed directly on to the substrate, then a part or portion of the second region may be in contact with the first region or the first region and the second region may be separated (e.g. by a gap).

When the second region is disposed or supported on the first region, all or part of the second region is preferably disposed directly on to the first region (i.e. the second region is in contact with a surface of the first region). The second region may be a second layer and the first region may be a first layer.

It may be preferable that only a portion or part of the second region is disposed or supported on the first region. Thus, the second region does not completely overlap or cover the first region.

Figure 5:
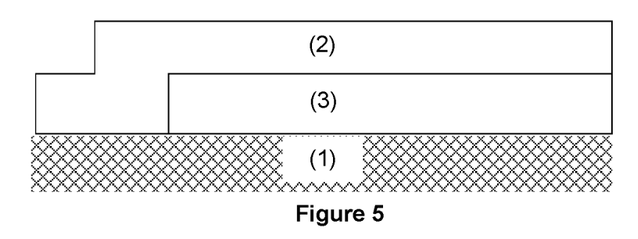

In addition or as an alternative, the second region may be disposed directly on to the substrate (i.e. the second region is in contact with a surface of the substrate; see FIGS. 1 to 3 and 5). The first region may be:
(i) disposed or supported on the second region (e.g. see FIGS. 2, 3 and 5); and/or
(ii) disposed directly on to the substrate [i.e. the first region is in contact with a surface of the substrate] (e.g. see FIGS. 1 to 3); and/or
(iii) in contact with the second region [i.e. the first region is adjacent to, or abuts, the second region].

When the first region is disposed directly on to the substrate, then a part or portion of the first region may be in contact with the second region or the first region and the second region may be separated (e.g. by a gap).

When the first region is disposed or supported on the second region, all or part of the first region is preferably disposed directly on to the second region (i.e. the first region is in contact with a surface of the second region). The first region may be a first layer and the second region may be a second layer.

In general, the first region may be a first layer or a first zone. When the first region is a first layer, then it is preferred that the first layer extends for an entire length (i.e. substantially an entire length) of the substrate, particularly the entire length of the channels of a substrate monolith. When the first region is a first zone, then typically the first zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second region may generally be a second layer or a second zone. When the second region is a second layer, then it is preferred that the second layer extends for an entire length (i.e. substantially an entire length) of the substrate, particularly the entire length of the channels of a substrate monolith. When the second region is a second zone, then typically the second zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In a first oxidation catalyst embodiment, the first region is arranged to contact the exhaust gas at or near the outlet end of the substrate and after contact of the exhaust gas with the second region.

There are several oxidation catalyst arrangements that facilitate the contact of the exhaust gas with the first region at an outlet end of the substrate and after the exhaust gas has been in contact with the second region. The first region is arranged or oriented to contact exhaust after it has contacted the second region when it has any one of the first to third oxidation catalyst arrangements.

Typically, the second region is arranged or oriented to contact exhaust gas before the first region. Thus, the second region may be arranged to contact exhaust gas as it enters the oxidation catalyst and the first region may be arranged to contact the exhaust gas as it leaves the oxidation catalyst. The zoned arrangement of the first oxidation catalyst arrangement is particularly advantageous in this respect.

In a first oxidation catalyst arrangement, the second region is disposed or supported upstream of the first zone. Preferably, the first region is a first zone disposed at or near an outlet end of the substrate and the second region is a second zone disposed at or near an inlet end of the substrate.

In a second oxidation catalyst arrangement, the second region is a second layer and the first region is a first zone. The first zone is disposed on the second layer at or near an outlet end of the substrate.

In a third oxidation catalyst arrangement, the second region is a second layer and the first region is a first layer. The second layer is disposed on the first layer.

In a second oxidation catalyst embodiment, the first region is arranged to contact the exhaust gas at or near the inlet end of the substrate and before contact of the exhaust gas with the second region.

There are several oxidation catalyst arrangements that facilitate the contact of the exhaust gas with the second region at an outlet end of the substrate and after the exhaust gas has been in contact with the first region. The second region is arranged or oriented to contact exhaust after it has contacted the first region when it has any one of the fourth to sixth oxidation catalyst arrangements.

Typically, the first region is arranged or oriented to contact exhaust gas before the second region. Thus, the first region may be arranged to contact exhaust gas as it enters the oxidation catalyst and the second region may be arranged to contact the exhaust gas as it leaves the oxidation catalyst. The zoned arrangement of the fourth oxidation catalyst arrangement is particularly advantageous in this respect.

In a fourth oxidation catalyst arrangement, the first region is disposed or supported upstream of the second zone. Preferably, the second region is a second zone disposed at or near an outlet end of the substrate and the first region is a first zone disposed at or near an inlet end of the substrate.

In a fifth oxidation catalyst arrangement, the first region is a first layer and the second region is a second zone. The second zone is disposed on the first layer at or near an outlet end of the substrate.

In a sixth oxidation catalyst arrangement, the first region is a first layer and the second region is a second layer. The first layer is disposed on the second layer.

In the first and fourth oxidation catalyst arrangements, the first zone may adjoin the second zone. Preferably, the first zone is contact with the second zone. When the first zone adjoins the second zone or the first zone is in contact with the second zone, then the first zone and the second zone may be disposed or supported on the substrate as a layer (e.g. a single layer). Thus, a layer (e.g. a single) may be formed on the substrate when the first and second zones adjoin or are in contact with one another. Such an arrangement may avoid problems with back pressure.

The first zone may be separate from the second zone. There may be a gap (e.g. a space) between the first zone and the second zone.

The first zone may overlap the second zone. Thus, an end portion or part of the first zone may be disposed or supported on the second zone. The first zone may completely or partly overlap the second zone. When the first zone overlaps the second zone, it is preferred that first zone only partly overlaps the second zone (i.e. the top, outermost surface of the second zone is not completely covered by the first zone).

Alternatively, the second zone may overlap the first zone. Thus, an end portion or part of the second zone may be disposed or supported on the first zone. The second zone generally only partly overlaps the first zone.

It is preferred that the first zone and the second zone do not substantially overlap.

In the second and fifth oxidation catalyst arrangements, the zone (i.e. the first or second zone) is typically disposed or supported on the layer (i.e. the first or second layer). Preferably the zone is disposed directly on to the layer (i.e. the zone is in contact with a surface of the layer).

When the zone (i.e. the first or second zone) is disposed or supported on the layer (i.e. the first or second layer), it is preferred that the entire length of the zone is disposed or supported on the layer. The length of the zone is less than the length of the layer.

In general, it is possible that both the first region and the second region are not directly disposed on the substrate (i.e. neither the first region nor the second region is in contact with a surface of the substrate).

Substrates for supporting oxidation catalysts for treating an exhaust gas from a diesel engine are well known in the art. Methods of making regions, zones and layers using washcoats and their application onto a substrate are also known in the art (see, for example, our WO 99/47260, WO 2007/077462 and WO 2011/080525).

The oxidation catalyst of the invention comprises a substrate. The substrate typically has an inlet end and an outlet end.

In general, the substrate has a plurality of channels (e.g. for the exhaust gas to flow through). Generally, the substrate is a ceramic material or a metallic material.

It is preferred that the substrate is made or composed of cordierite ($SiO_2$—$Al2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art.

The substrate monolith may be a flow-through monolith. Alternatively, the substrate monolith may be a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The invention also provides an exhaust system comprising the oxidation catalyst and an emissions control device.

The oxidation catalyst of the invention may be used as a cold start catalyst, a diesel oxidation catalyst or a hydrocarbon slip catalyst. When the oxidation catalyst is used as a hydrocarbon slip catalyst, then it may also be used as an ammonia slip catalyst because the oxidation catalyst may be able to oxidise ammonia. Any reference below to the use of the oxidation catalyst as an ammonia slip catalyst embraces the use of the oxidation catalyst as a hydrocarbon slip catalyst.

It is preferred that it is a diesel oxidation catalyst (DOC).

The exhaust system of the invention may comprise an emissions control device selected from a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas upstream (e.g. directly upstream) of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the exhaust system may further comprise an engine management means for enriching the exhaust gas with hydrocarbons.

When the oxidation catalyst is used as a cold start catalyst or a diesel oxidation catalyst (DOC), then typically there is no emissions control device upstream of the oxidation catalyst in the exhaust system. The oxidation catalyst may be coupled (e.g. directly) to an exhaust manifold or a turbocharger of the internal combustion engine. Thus, an inlet of the oxidation catalyst may be fluidly coupled to an exhaust manifold or a turbocharger of the internal combustion engine.

When the oxidation catalyst is used as an ammonia slip catalyst (ASC), then typically the ammonia slip catalyst is downstream (e.g. directly downstream) of a selective catalytic reduction (SCR) catalyst or a selective catalytic reduction filter (SCRF™) catalyst. The ammonia slip catalyst (ASC) may be coupled (e.g. directly) to a selective catalytic reduction (SCR) catalyst or a selective catalytic reduction filter (SCRF™) catalyst. For example, an inlet of the ammonia slip catalyst (ASC) catalyst may be fluidly coupled to an outlet of a selective catalytic reduction (SCR) catalyst or a selective catalytic reduction filter (SCRF™) catalyst. The ammonia slip catalyst (ASC) and the selective catalytic reduction (SCR) catalyst or the selective catalytic reduction filter (SCRF™) catalyst may be located within the same casing.

The oxidation catalyst of the invention may be able to minimise or avoid the formation of $N_2O$ under conditions at which $NH_3$ oxidation can occur. This is particularly advantageous when the oxidation catalyst is located downstream of a selective catalytic reduction (SCR) catalyst or a selective catalytic reduction filter (SCRF™) catalyst.

In a first exhaust system embodiment, the exhaust system comprises the oxidation catalyst of the invention and a catalysed soot filter (CSF). The oxidation catalyst is typically followed by (e.g. is upstream of) the catalysed soot filter (CSF). Thus, for example, an outlet of the oxidation catalyst is connected to an inlet of the catalysed soot filter.

A second exhaust system embodiment relates to an exhaust system comprising the oxidation catalyst of the invention, a catalysed soot filter (CSF) and a selective catalytic reduction (SCR) catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third exhaust system embodiment, the exhaust system comprises the oxidation catalyst of the invention, a selective catalytic reduction (SCR) catalyst and either a catalysed soot filter (CSF) or a diesel particulate filter (DPF).

In the third exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth exhaust system embodiment comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst.

A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

When the exhaust system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

A fifth exhaust system embodiment comprises either a selective catalytic reduction (SCR) catalyst or a selective catalytic reduction filter (SCRF™) catalyst and an oxidation catalyst of the invention. The SCR catalyst or the selective catalytic reduction filter (SCRF™) catalyst is typically followed by (e.g. is upstream of) the oxidation catalyst of the invention.

A nitrogenous reductant injector may be arranged upstream of the SCR catalyst or the selective catalytic reduction filter (SCRF™) catalyst.

Another aspect of the invention relates to an apparatus (e.g. for a power plant). The apparatus may comprise an internal combustion engine, such as a natural gas turbine or an engine as described below.

The invention also relates to a vehicle, which comprises an internal combustion engine. The internal combustion engine is coupled to an exhaust system of the invention.

The internal combustion engine may be a lean burn internal combustion engine. The lean burn internal combustion engine may be a spark ignition engine or a compression ignition engine. It is preferred that the lean burn internal combustion engine is a compression ignition engine, such as a diesel engine.

The compression ignition engine may be a homogeneous charge compression ignition (HCCI) engine, a pre-mixed charge compression ignition (PCCI) engine or a low temperature combustion (LTC) engine. It is preferred that the compression ignition engine is a diesel engine (i.e. a conventional, traditional diesel engine).

The internal combustion engine may be a natural gas (NG) engine. When the vehicle comprises a natural gas (NG) engine, then the vehicle is a natural gas vehicle (NGV).

The natural gas (NG) engine may be a dedicated NG engine (i.e. purpose built for using natural gas as a fuel) or a modified engine (i.e. an engine, such as a conventional gasoline or diesel engine, modified to use natural gas as a fuel). The modified engine is typically configured to use natural gas as a fuel or the modified engine comprises hardware to allow the use of natural gas as a fuel. This hardware is generally not present in conventional gasoline or diesel engines. The modified engine may be a dual fuel engine.

The natural gas (NG) engine may be a liquefied natural gas (LNG) engine or a compressed natural gas engine, preferably the NG engine is a compressed natural gas (CNG) engine. More preferably, the NG engine is a lean-burn compressed natural gas (lean-burn CNG) engine.

A problem with using NG as a fuel is that NG has a high octane number and a low cetane number. Several engine designs are known that allow the use of NG as a fuel.

The internal combustion engine may be a spark ignition natural gas (SING) engine, a direct injection natural gas (DING) engine or a dual fuel natural gas (DFNG) engine. SING engines utilise the Otto cycle, whereas DING and DFNG engines utilise the Diesel cycle.

The internal combustion engine may be a SING engine. The SING engine may be a lean burn SING engine or a stoichiometric SING engine. It is preferred that the SING engine is a lean burn SING engine.

When the internal combustion engine is a SING engine and exhaust system further comprises an emissions control device, then preferably the emissions control device is a three-way catalyst (TWC) or a gasoline particulate filter (GPF).

Alternatively, the internal combustion engine may be a DING engine. The DING engine may comprise a glow plug (e.g. as an ignition source) or an injection system for the pilot injection of diesel fuel. When the DING engine comprises an injection system for the pilot injection of diesel fuel, then preferably the DING engine is not a dual fuel engine. The injection system allows the use of a small quantity of diesel fuel as an ignition source and it does not have the capability to inject large quantities of diesel fuel.

As a further alternative, the internal combustion engine may be a DFNG engine. The DFNG engine is typically configured to mix natural gas (NG) with intake air before induction to a cylinder of the engine.

Typically, the DFNG engine is a dual fuel engine. The DFNG engine may be configured or configurable to operate in a first mode, where diesel is the only fuel, and a second mode, where a mixture of natural gas and diesel is the fuel.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≥75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory oxide thereof.

The term "selective catalytic reduction filter catalyst" as used herein includes a selective catalytic reduction formulation that has been coated onto a diesel particulate filter (SCR-DPF), which is known in the art.

EXAMPLES

The invention will now be illustrated by the following non-limiting examples.

Example 1

Alumina powder was slurried in water and milled to a d50<10 micron. The resulting washcoat was applied to a 200 cpsi metallic substrate with doses applied from both ends. The part was dried and calcined to 500° C. An impregnation solution was prepared with tetraammine platinous salt. The impregnation solution was applied to the washcoated metallic substrate from both ends, dried and re-calcined at 500° C. The resulting catalyst had a total PGM loading of 40 g ft$^{-3}$ Pt. The coating loading was 1.6 g in$^{-3}$.

Example 2

Alumina powder was slurried in water and milled to a d50<10 micron. The resulting washcoat was applied to a 200 cpsi metallic substrate with doses applied from both ends. The part was dried and calcined to 500° C. An impregnation solution was prepared with Pd nitrate in 1 wt % nitric acid. The impregnation solution was applied to the washcoated metallic substrate from both ends, dried and re-calcined at 500° C. The resulting catalyst had a total PGM loading of 10 g ft$^{-3}$ Pd. The coating loading was 1.6 g in$^{-3}$.

Example 3

Alumina powder was slurried in water and milled to a d50<10 micron. The resulting washcoat was applied to a 230 cpsi ceramic substrate with doses applied from both ends. The part was dried and calcined to 500° C. An impregnation solution was prepared with Ru nitrate. The impregnation solution was applied to the washcoated ceramic substrate from both ends, dried and re-calcined at 500° C. The resulting catalyst had a total PGM loading of 144 g ft$^{-3}$ Ru. The coating loading was 1.11 g in$^{-3}$.

Example 4

A mixed oxide powder of ceria and zirconia was slurried in water and milled to a d50<5 micron. A sol of ceria and zirconia was added to the solution. The resulting washcoat was applied to a 230 cpsi ceramic substrate with doses applied from both ends. The part was dried and calcined to 500° C. An impregnation solution was prepared with Ru nitrate. The impregnation solution was applied to the washcoated ceramic substrate from both ends, dried and re-calcined at 500° C. The resulting catalyst had a total PGM loading of 144 g ft$^{-3}$ Ru. The coating loading was 1.31 g in$^{-3}$.

TESTING

Figure 6:
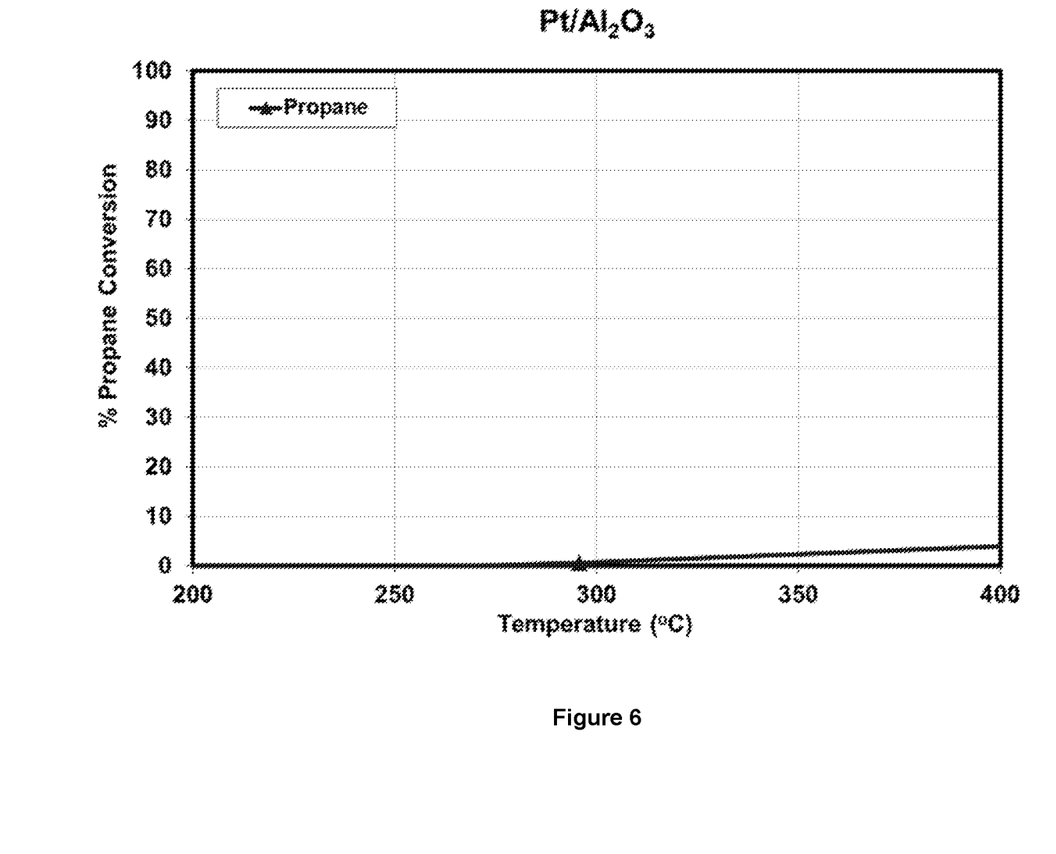
FIGS. 6 to 9 show the % propane conversion of various catalysts.
Figure 7:
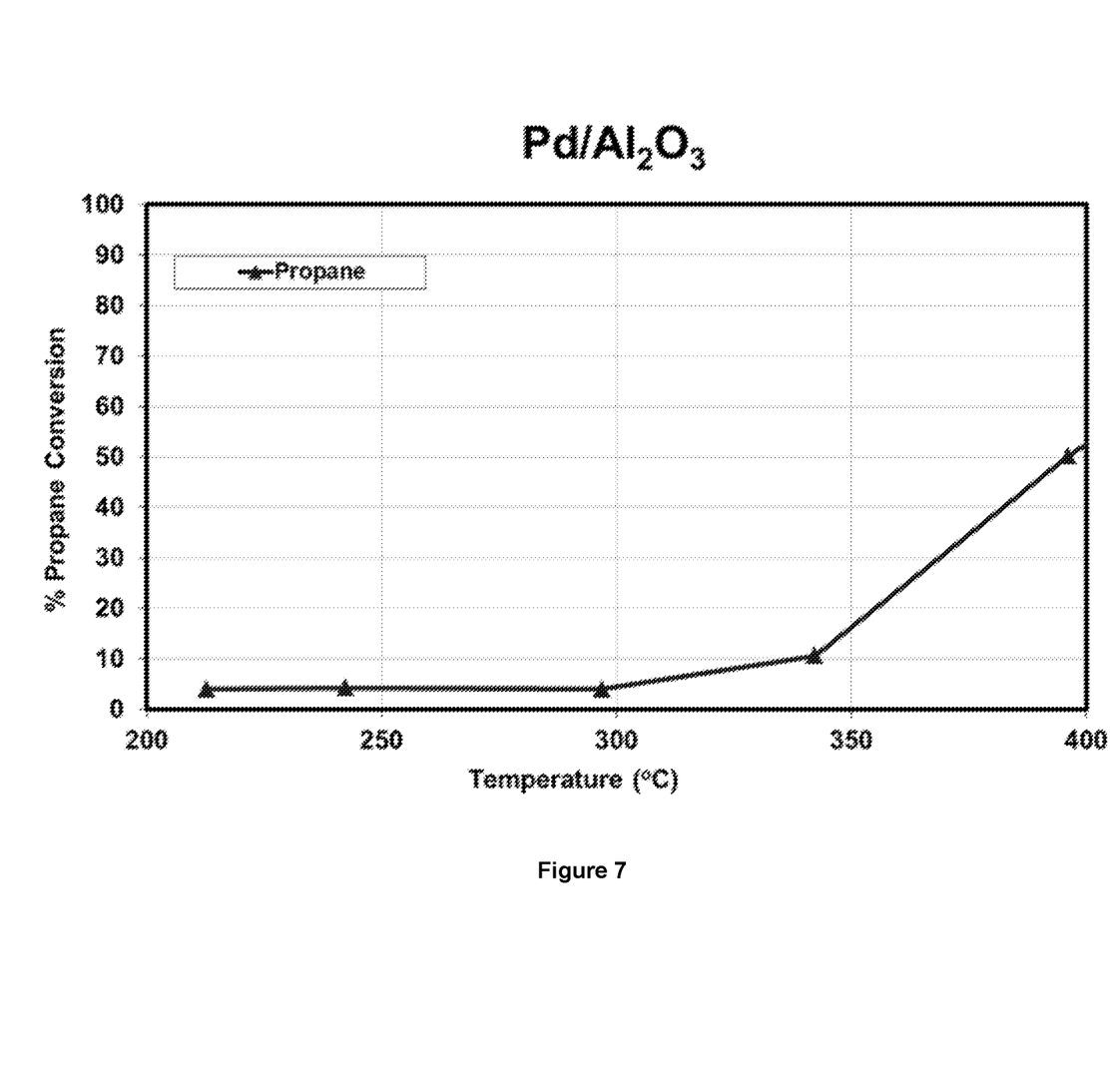
Figure 8:
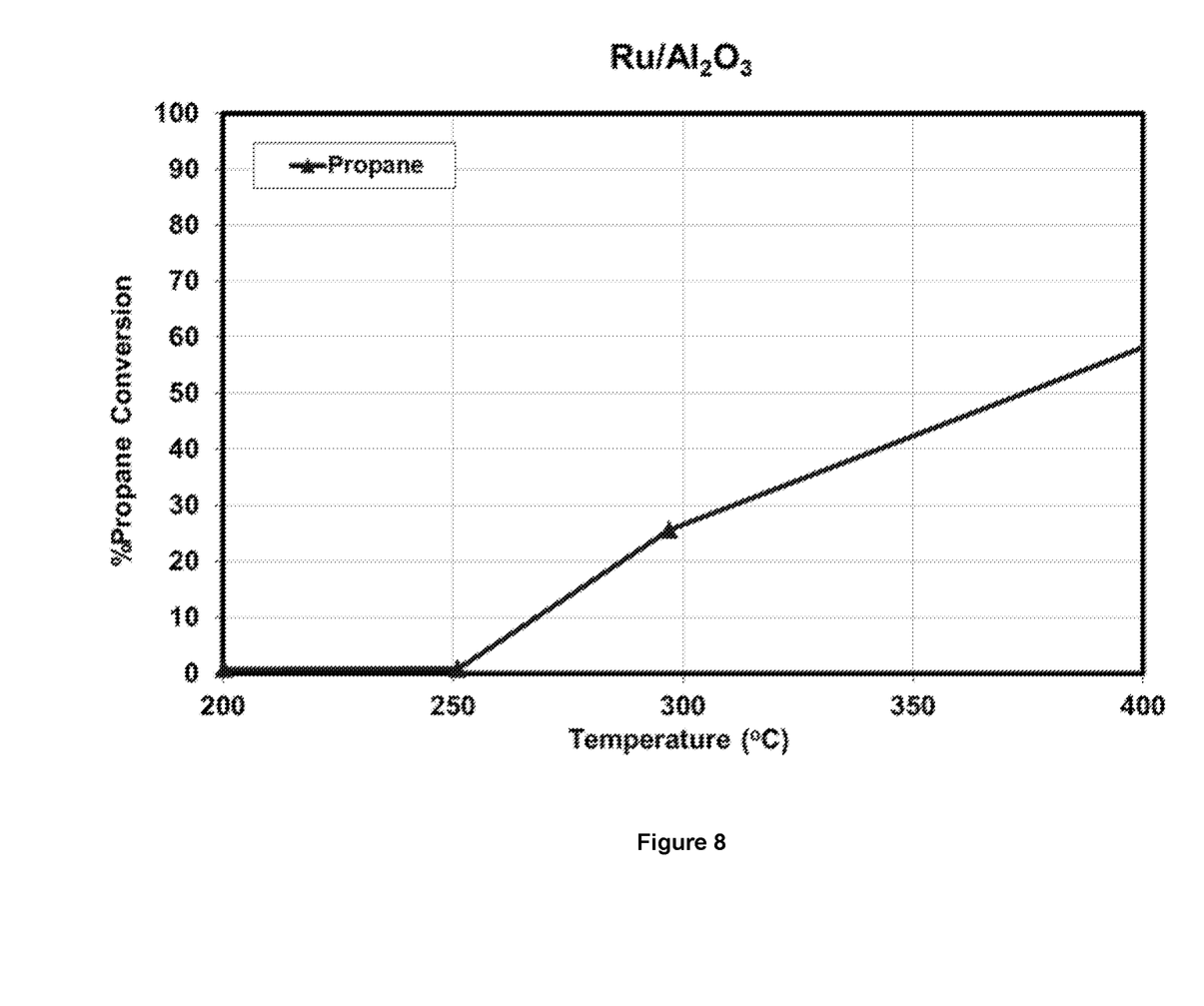
Figure 9:
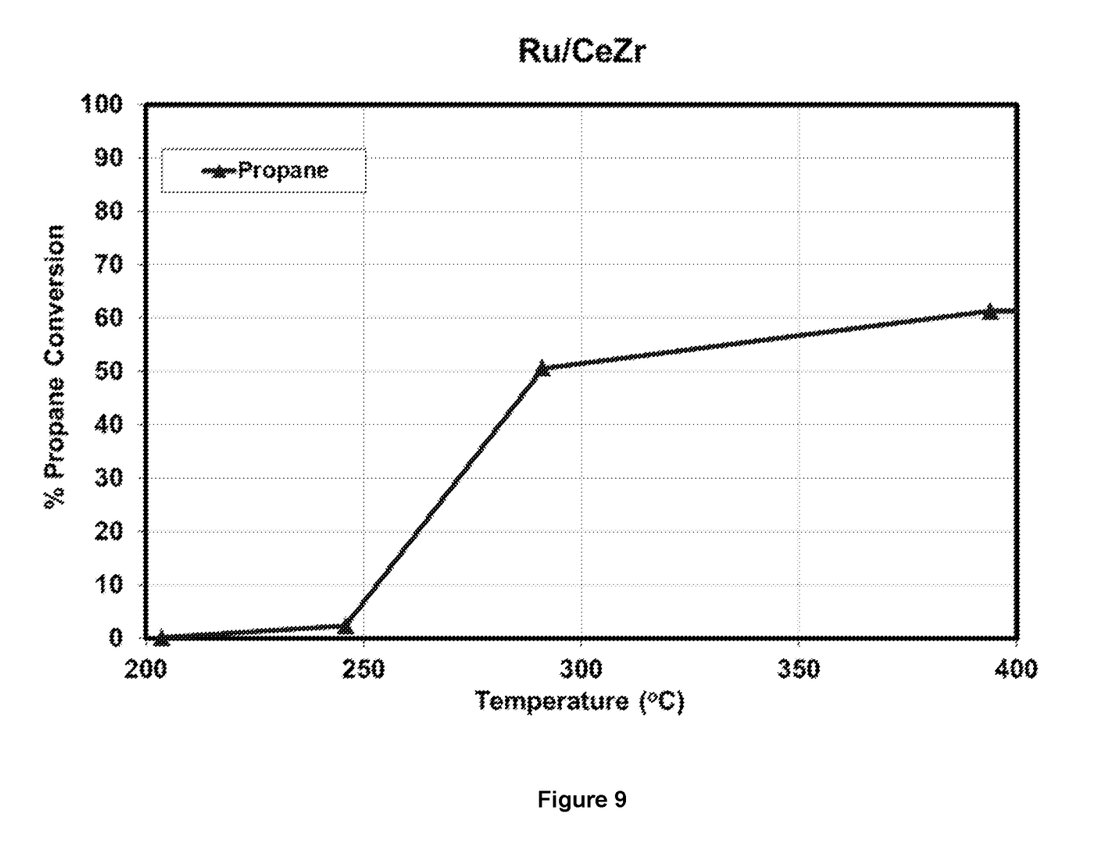

Reactor testing was performed in a stainless steel flow reactor at a space velocity of 200,000 hr$^{-1}$ for Examples 1, 3 and 4. A space velocity of 50,000 hr$^{-1}$ was used for Example 2. The test gas mixture contained 50 ppm CO, 40 ppm NH$_3$, 50 ppm as C1 propane, 50 ppm as C1 propene, 15% O$_2$, 8% H$_2$O, 3% CO$_2$ in a balance of nitrogen. The catalyst was ramped to temperatures of 200, 250, 300, 400, and 500° C. and held until achieving steady state. Conversion of each component over the catalyst was then evaluated using FTIR. The results are shown in FIGS. 6 to 9.

For the avoidance of any doubt, the entire content of any and all documents cited herein is incorporated by reference into the present application.

The invention claimed is:

1. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide,
   wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and
   the oxidation catalyst further comprises a second region, wherein the second region comprises the noble metal supported on a second support material, and
   wherein the first region is a first zone disposed at or near an outlet end of the substrate and the second region is a second zone disposed at or near an inlet end of the substrate.

2. An oxidation catalyst according to claim 1, wherein the substrate is a flow-through monolith or a filtering monolith.

3. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide,
   wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and
   the oxidation catalyst further comprises a second region, wherein the second region comprises the noble metal supported on a second support material, and
   wherein the second region is a second layer and the first region is a first zone, and wherein the first zone is disposed on the second layer at or near an outlet end of the substrate.

4. An oxidation catalyst according to claim 3, wherein the substrate is a flow-through monolith or a filtering monolith.

5. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide,
   wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and
   the oxidation catalyst further comprises a second region, wherein the second region comprises the noble metal supported on a second support material, and
   wherein the second region is a second layer and the first region is a first layer, and wherein the second layer is disposed on the first layer.

6. An oxidation catalyst according to claim 5, wherein the substrate is a flow-through monolith or a filtering monolith.

7. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide, wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and the oxidation catalyst further comprises a second region, wherein the second region comprises the noble metal supported on a second support material, and wherein the second region is a second zone disposed at or near an outlet end of the substrate and the first region is a first zone disposed at or near an inlet end of the substrate.

8. An oxidation catalyst according to claim 7, wherein the substrate is a flow-through monolith or a filtering monolith.

9. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide, wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and the oxidation catalyst further comprises a second region, wherein the second region comprises the noble metal supported on a second support material, and wherein the first region is a first layer and the second region is a second zone, and wherein the second zone is disposed on the first layer at or near an outlet end of the substrate.

10. An oxidation catalyst according to claim 9, wherein the substrate is a flow-through monolith or a filtering monolith.

11. An oxidation catalyst for treating hydrocarbons in an exhaust gas produced by an internal combustion engine, wherein the oxidation catalyst comprises a first region disposed on a substrate, wherein the first region comprises ruthenium (Ru) supported on a first support material comprising a refractory oxide, wherein the first region further comprises a noble metal (NM) supported on a second support material, wherein the noble metal is selected from the group consisting of platinum (Pt), palladium (Pd), a combination or a mixture of platinum (Pt) and palladium (Pd), and a combination or a mixture of palladium (Pd) and gold (Au), and the oxidation catalyst further comprises a second region, wherein the second region comprises the noble metal supported on a second support material, and wherein the first region is a first layer and the second region is a second layer, and wherein the first layer is disposed on the second layer.

12. An oxidation catalyst according to claim 11, wherein the substrate is a flow-through monolith or a filtering monolith.

13. An exhaust system for treating hydrocarbons in an exhaust gas produced by an internal combustion engine, wherein the exhaust system comprises the oxidation catalyst of claim 1 and an emissions control device.

14. A vehicle comprising an internal combustion engine and an exhaust system according to claim 13.

15. A vehicle according to claim 14, wherein the internal combustion engine is a natural gas engine.

16. An exhaust system for treating hydrocarbons in an exhaust gas produced by an internal combustion engine, wherein the exhaust system comprises the oxidation catalyst of claim 3 and an emissions control device.

17. A vehicle comprising an internal combustion engine and an exhaust system according to claim 16.

18. A vehicle according to claim 17, wherein the internal combustion engine is a natural gas engine.

19. An exhaust system for treating hydrocarbons in an exhaust gas produced by an internal combustion engine, wherein the exhaust system comprises the oxidation catalyst of claim 5 and an emissions control device.

20. A vehicle comprising an internal combustion engine and an exhaust system according to claim 19.

21. A vehicle according to claim 20, wherein the internal combustion engine is a natural gas engine.

22. An exhaust system for treating hydrocarbons in an exhaust gas produced by an internal combustion engine, wherein the exhaust system comprises the oxidation catalyst of claim 7 and an emissions control device.

23. A vehicle comprising an internal combustion engine and an exhaust system according to claim 22.

24. A vehicle according to claim 23, wherein the internal combustion engine is a natural gas engine.

25. An exhaust system for treating hydrocarbons in an exhaust gas produced by an internal combustion engine, wherein the exhaust system comprises the oxidation catalyst of claim 9 and an emissions control device.

26. A vehicle comprising an internal combustion engine and an exhaust system according to claim 25.

27. A vehicle according to claim 26, wherein the internal combustion engine is a natural gas engine.

28. An exhaust system for treating hydrocarbons in an exhaust gas produced by an internal combustion engine, wherein the exhaust system comprises the oxidation catalyst of claim 11 and an emissions control device.

29. A vehicle comprising an internal combustion engine and an exhaust system according to claim 28.

30. A vehicle according to claim 29, wherein the internal combustion engine is a natural gas engine.

* * * * *